(12) United States Patent
Li

(10) Patent No.: US 10,660,362 B2
(45) Date of Patent: May 26, 2020

(54) AUTOMATIC CIGARETTE-LIGHTING PURIFIER

(71) Applicant: Dongguan Revolution Product Design Co., Ltd., Dongguan (CN)

(72) Inventor: Yeung Tak Lugee Li, Hongkong (HK)

(73) Assignee: DONGGUAN REVOLUTION PRODUCT DESIGN CO., LTD., Dongguan (CN)

(*) Notice: Subject to any disclaimer, the term of this patent is extended or adjusted under 35 U.S.C. 154(b) by 309 days.

(21) Appl. No.: 15/569,936

(22) PCT Filed: May 10, 2016

(86) PCT No.: PCT/CN2016/081523
§ 371 (c)(1),
(2) Date: Oct. 27, 2017

(87) PCT Pub. No.: WO2016/197776
PCT Pub. Date: Dec. 15, 2016

(65) Prior Publication Data
US 2018/0153210 A1      Jun. 7, 2018

(30) Foreign Application Priority Data

Jun. 9, 2015  (CN) .......................... 2015 1 0312659

(51) Int. Cl.
*A24F 13/04* (2006.01)
*A24F 13/00* (2006.01)
(Continued)

(52) U.S. Cl.
CPC .............. *A24F 13/04* (2013.01); *A24F 13/00* (2013.01); *A24F 13/12* (2013.01);
(Continued)

(58) Field of Classification Search
None
See application file for complete search history.

(56) References Cited

U.S. PATENT DOCUMENTS 5,592,955 A * 1/1997 Keritsis .................. A24F 13/16
                                                                  131/175
6,006,757 A * 12/1999 Lichtenberg ............ A24F 13/00
                                                                  131/187

FOREIGN PATENT DOCUMENTS

CN            104489924    *  4/2015  .............. A24F 1/28
WO  WO-2006073305 A1 *  7/2006  .............. A24F 13/02

OTHER PUBLICATIONS

CN 104489924 translation (Year: 2015).*

* cited by examiner

*Primary Examiner* — Michael J Felton
*Assistant Examiner* — Katherine A Will
(74) *Attorney, Agent, or Firm* — Shimokaji IP

(57) ABSTRACT

An automatic cigarette-lighting purifier includes a cigarette holding chamber and a smoke purification device, one end of the cigarette holding is provided with a chamber opening which is communicated with the smoke purification device and the cigarette holding chamber, and a cigarette positioning member is provided at the chamber opening. The automatic cigarette-lighting purifier further includes a ventilation end cap that is movable to cover the end of the cigarette holding chamber that is opposite to the chamber opening, and a cigarette-lighting member is at one side of the ventilation end cap. A cigarette can be lighted automatically by the cigarette-lighting device once it's placed in the purifier, and the burned cigarette is always kept in the purifier, thus no unfiltered second-hand smoke is produced. Furthermore, the structure of the automatic cigarette-lighting purifier is
(Continued)

simple, the operation is convenient, and the possibilities of scalding and cigarette ash falling are prevented.

5 Claims, 9 Drawing Sheets

(51) Int. Cl.
    *A24F 13/12*     (2006.01)
    *B01D 46/24*     (2006.01)
    *B01D 46/42*     (2006.01)
    *F23Q 7/14*     (2006.01)
(52) U.S. Cl.
    CPC ..... B01D 46/2403 (2013.01); B01D 46/4272 (2013.01); F23Q 7/14 (2013.01); *B01D 2275/10* (2013.01); *B01D 2279/00* (2013.01)

AUTOMATIC CIGARETTE-LIGHTING PURIFIER

FIELD OF THE INVENTION

The invention relates to a cigarette purifier, and more particularly to a handy cigarette purifier.

BACKGROUND OF THE INVENTION

Second-hand smoking is general but is harmful. Smokers hope the damages of the second-hand smoking can be reduced while they are smoking.

Handheld cigarette purifiers are currently developed, so that the smokers can smoke in public places without affecting the other people. For example, Chinese patent application publication No. 200710162388.5 discloses a cigarette gas purification device. Specifically, after the cigarette is burned, the burned cigarette is inserted into the cigarette holder, and then the cigarette holder with the cigarette is inserted into the purification device. Apparently, such an operation is inconvenient, and the possibilities of scalding and cigarette ash falling are high. Additionally, before the cigarette is inserted into the purification device, smoke gas has been generated and pollutes the environment. Furthermore, the efficiency of this cigarette purifier is low. By this token, this current cigarette purifier has obvious drawbacks.

Therefore, there is a need for providing a cigarette purifier that is handheld and has simple structure, to solve the drawbacks of the prior arts.

SUMMARY OF THE INVENTION

One objective of the present invention is to provide a handheld and simple automatic cigarette-lighting purifier, which has convenient operation and reduces the possibilities of scalding and cigarette ash falling.

To achieve the above-mentioned objective, the present invention provides an automatic cigarette-lighting purifier, which comprising a cigarette holding chamber and a smoke purification device located around the cigarette holding chamber. A chamber opening of the cigarette holding chamber and an air inlet of the smoke purification device are located at the same side of the automatic cigarette-lighting purifier, and a cigarette-lighting device is provided at one end of the cigarette holding chamber that is opposite to the chamber opening.

In comparison with the prior art, the cigarette can be lighted automatically by the cigarette-lighting device once it's placed in the automatic cigarette-lighting purifier, and the burned cigarette is always kept in the automatic cigarette-lighting purifier, thus no unfiltered second-hand smoke is produced. Furthermore, the structure of the automatic cigarette-lighting purifier according to the present invention is simple, the operation is convenient, and the possibilities of scalding and cigarette ash falling are prevented.

Preferably, an air intake port is provided at the end of the cigarette holding chamber that is opposite to the chamber opening, a first check valve is provided at the air intake port to allow air to only flow toward the cigarette holding chamber, and a second check valve is provided at the air inlet of the smoke purification device to allow air to only flow toward the smoke purification device.

Preferably, the cigarette-lighting device comprises a cigarette-lighting member for lighting a cigarette and a power source for controlling the cigarette-lighting member.

Preferably, a cigarette positioning member is provided at the chamber opening, and the automatic cigarette-lighting purifier further comprises a ventilation end cap that is movable to cover the end of the cigarette holding chamber that is opposite to the chamber opening; and the cigarette-lighting member is located at one side of the ventilation end cap that faces to the cigarette holding chamber and formed toward an interior of the cigarette holding chamber.

Preferably, the cigarette positioning member is a reticular partition configured at a side wall of the cigarette holding chamber, or an annular partition configured at the side wall of the cigarette holding chamber and having a diameter that is smaller than that of a cigarette.

Preferably, the cigarette-lighting member is resistance wire that is in a linear spring shape.

Preferably, when the cigarette-lighting member is in a relaxed situation, a distance between the cigarette positioning member and the end of the ventilation end cap that is opposite to the cigarette-lighting member is shorter than or equal to a length of a cigarette filter.

Preferably, one side of the ventilation end cap is pivotally connected to an external wall of the automatic cigarette-lighting purifier, and an engaging device is configured between another side of the ventilation end cap and the external wall of the automatic cigarette-lighting purifier.

Preferably, the cigarette-lighting member is fixed to the end of the cigarette holding chamber that is opposite to the chamber opening.

Preferably, a ratio of an inner diameter of the cigarette holding chamber to a diameter of a cigarette is larger than 1:1 and smaller than 1.2:1.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
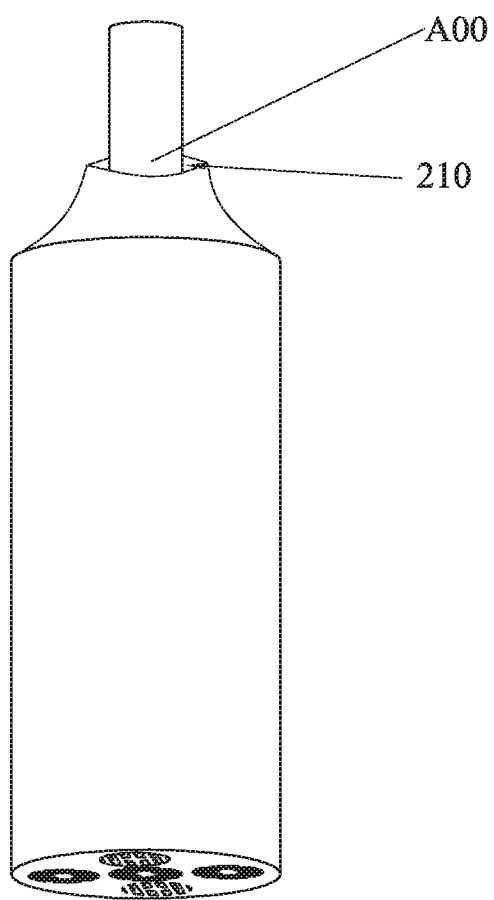
FIG. 1 is a perspective view of an automatic cigarette-lighting purifier according to a first embodiment of the present invention.
Figure 2:
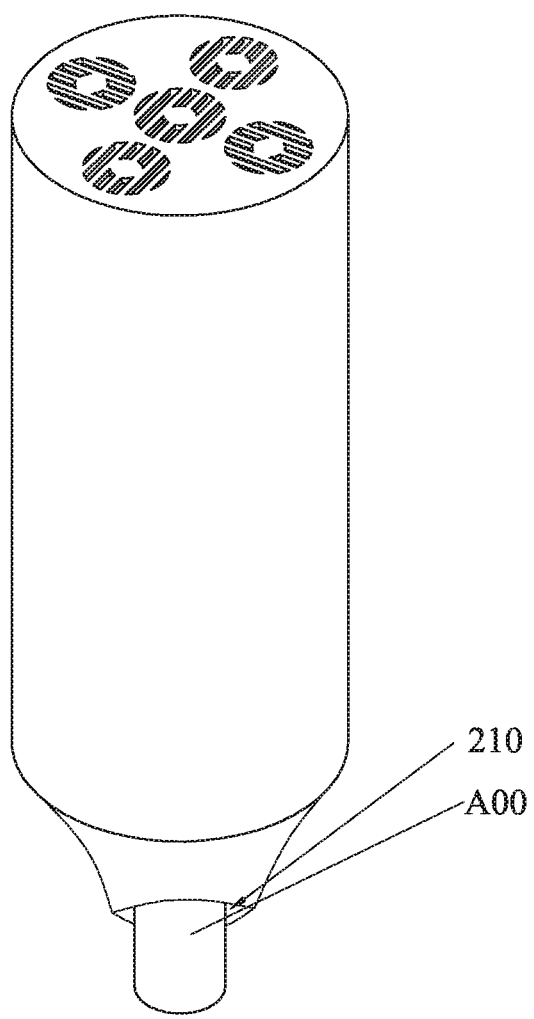
FIG. 2 is another perspective view of an automatic cigarette-lighting purifier according to a first embodiment of the present invention.
Figure 3:
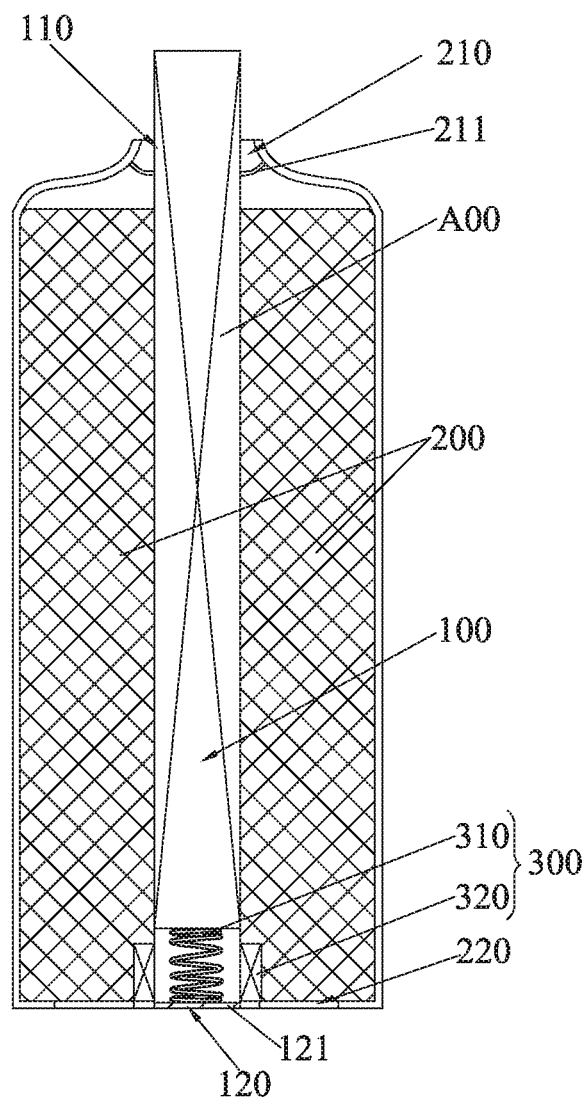
FIG. 3 is a cross section view of an automatic cigarette-lighting purifier according to a first embodiment of the present invention.

As shown in FIGS. 1-3, an automatic cigarette-lighting purifier according to the present invention includes a cigarette holding chamber 100 and a smoke purification device 200 located around the cigarette holding chamber 100. A chamber opening 110 of the cigarette holding chamber 100 and an air inlet 210 of the smoke purification device 200 are located at the same side of the automatic cigarette-lighting purifier, and a cigarette-lighting device 300 is provided at one end of the cigarette holding chamber 100 that is opposite to the chamber opening 110.

Specifically, the cigarette holding chamber 100 is sized to fit with a cigarette, to hold and position the cigarette A00. The cigarette holding chamber 100 is shaped as a cylinder that has two communicating ends and a closed wall, one end of the cigarette holding chamber 100 is provided with the chamber opening 110 that is communicated with the chamber 100, by which the cigarette A00 can be inserted into the cigarette holding chamber 100. Another end of the cigarette holding chamber 100 that is opposite to the chamber opening 110 is an air intake port 120, when user smokes, air required by the cigarette burning enters to the cigarette holding chamber 100 via the air intake port 120. Preferably, a first check valve 121 is provided at the air intake port 120 to allow air to only flow toward the cigarette holding chamber 100, so as to prevent cigarette gas from escaping from the cigarette holding chamber 100. In other words, due to the first check valve 121, the external air can only enter to the cigarette holding chamber 100 via the air intake port 120, but the air in the cigarette holding chamber 100 can't go outside via the air intake port 120.

As shown in FIG. 3, the cigarette-lighting device 300 includes a cigarette-lighting member 310 for lighting a cigarette A00 and a power source 320 for controlling the cigarette-lighting member 310. The cigarette-lighting member 310 is fixed to the end of the cigarette holding chamber 100 that is opposite to the chamber opening 110, that is the cigarette-lighting member 310 is fixed at the air intake port 120. When then cigarette is held in the cigarette holding chamber 100, placing the cigarette-lighting purifier vertically to make the chamber opening 110 upwards, so that the end of the cigarette A00 presses against the cigarette-lighting member 310, thereby user may smoke.

The smoke purification device 200 is located around the cigarette holding chamber 100. Specifically, the smoke purification device 200 includes a cylindrical receiver that is around the cigarette holding chamber 100 and concentric with the cigarette holding chamber 100, a tar filter layer, a nicotine filter layer and a solid smoke filter layer configured in the cylindrical receiver. Two openings are formed at two ends of the cylindrical receiver, specifically, one of the openings closed to the chamber opening 110 is annular and concentric with the chamber opening 110, which is defined as an air inlet 210; and another of the openings opposite to the chamber opening 110 is defined as an air outlet 220, which is for exhausting the purified second-hand smoke gas. The second-hand smoke gas exhaled by user will enter to the smoke purification device 200 via the air inlet 210.

Preferably, for preventing the smoke with nicotine from escaping from the smoke purification device 200, a second check valve 211 is provided at the air inlet 210 of the smoke purification device 200 to allow air to only flow toward the smoke purification device 200. That is, the smoke can only enter to the smoke purification device 200 via the air inlet 210, but the smoke in the smoke purification device 200 can't go out of the smoke purification device 200.

Preferably, a ratio of the inner diameter of the cigarette holding chamber 100 to the diameter of the cigarette A00 is larger than 1:1 and smaller than 1.2:1. Specifically, the inner diameter of the cigarette holding chamber 100 is slightly bigger than the diameter of the cigarette A00, so that the end of the cigarette A00 can press against the cigarette-lighting member to light the cigarette A00, when the cigarette A00 is inserted into the chamber 100. Based on this configuration, smoke escaping from the gap between the cigarette holding chamber 100 and the cigarette A00 is slight, which may not trigger the smoke detector.

Figure 4:
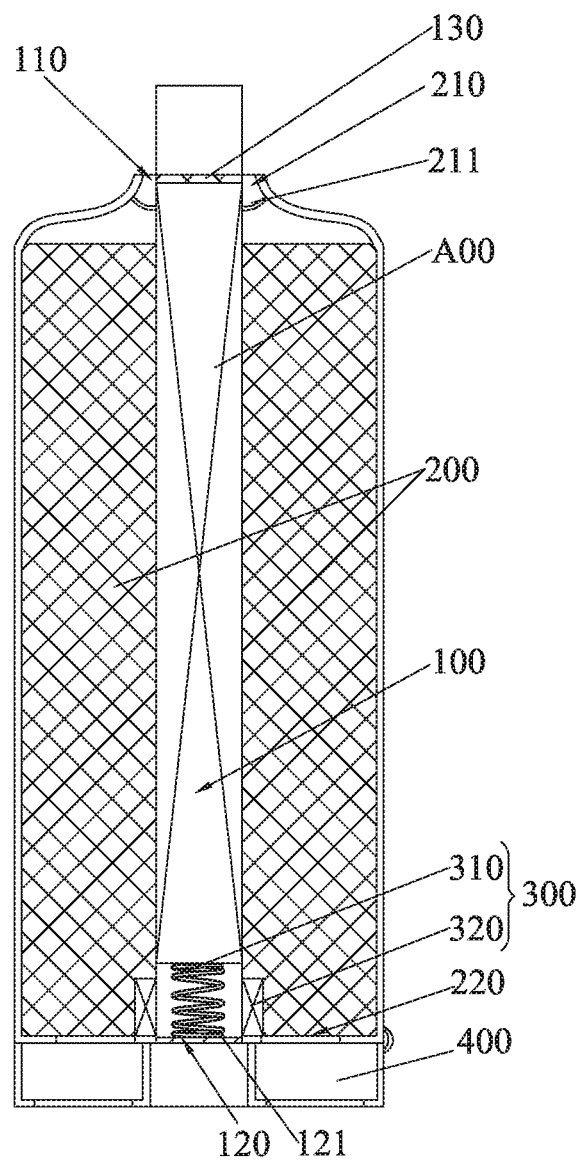
FIG. 4 is a cross section view of an automatic cigarette-lighting purifier according to a second embodiment of the present invention.
Figure 5:
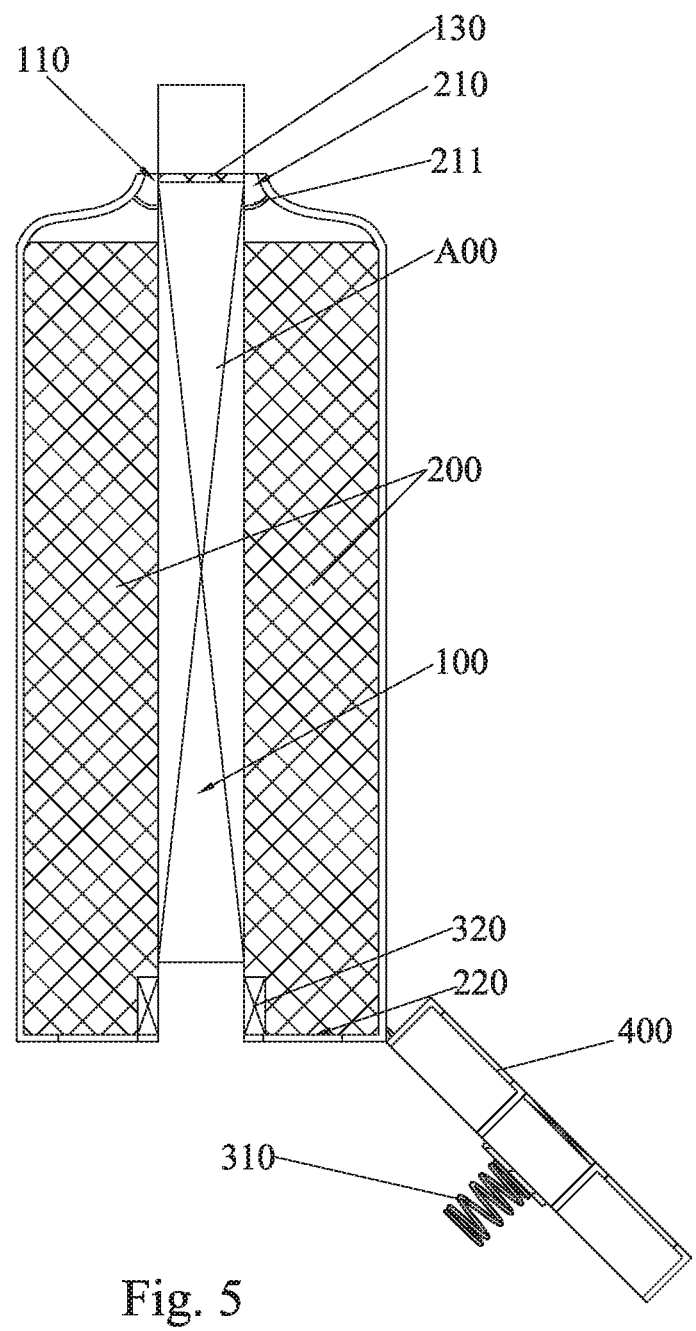
FIG. 5 is a cross section view of an automatic cigarette-lighting purifier that is in an open position according to the second embodiment of the present invention.

FIGS. 4 and 5 show a second embodiment of the automatic cigarette-lighting purifier.

Differing from the first embodiment, in this embodiment, a cigarette positioning member 130 is provided at the chamber opening 110, and the automatic cigarette-lighting purifier further includes a ventilation end cap that is movable to cover the end of the cigarette holding chamber 100 that is opposite to the chamber opening 110.

Specifically, the cigarette positioning member 130 is a reticular partition configured at the side wall of the cigarette holding chamber 100, or an annular partition configured at the side wall of the cigarette holding chamber 100 and having a diameter that is smaller than that of the cigarette. The cigarette positioning member 130 is used for limiting the cigarette and making the smoke gas in the cigarette holding chamber 100 to go through the positioning member 130 to reach the chamber opening 110. The partition can has other shapes, such as an annular and reticular partition.

A cigarette-lighting member 310 is formed toward the cigarette holding chamber 100 and at the side of the ventilation end cap 400, and the cigarette-lighting member 310 is connected with the power source 320 thereby lighting the cigarette. Specifically, the cigarette-lighting member 310 is a linear spring, one end of which is fixed on the ventilation end cap 400. When no cigarette is held in the chamber 100, the cigarette-lighting member 310 is in a relaxed position. Another end of the cigarette-lighting member 310 is suspended in the chamber 100, and a distance between the cigarette positioning member 130 and the end of the ventilation end cap 400 that is opposite to the cigarette-lighting member 310 is shorter than or equal to a length of a cigarette filter. When a cigarette A00 is held in the chamber 100, the cigarette-lighting member 310 is compressed and pressed against the tobacco end of the cigarette A00. The length of the cigarette-lighting member 310 varies with the length of the cigarette in the chamber 100, furthermore, the distance between the cigarette positioning member 130 and the end of the ventilation end cap 400 that is opposite to the cigarette-lighting member 310 is shorter than or equal to the length of the cigarette filter, thus it's enable that the cigarette-lighting member 310 pushes against the cigarette A00, so that the cigarette A00 can be positioned by the inner wall of the chamber 100, the cigarette positioning member 130 and the cigarette-lighting member 310. Furthermore, in the automatic cigarette-lighting purifier according to the present invention, the cigarette is lighted by heating the resistance wire, therefore no immeasurable flame is generated to cause danger. Moreover, the position of the cigarette-lighting member 310 is stable, since one end of the member 310 is connected with the inner side of the ventilation end cap 400, another end of the member 310 presses against the chamber 100, thus the burned cigarette-lighting member 310 can only light the cigarette but not light the others.

In this embodiment, the ventilation end cap 400 is movable to cover the end of the cigarette holding chamber 100 that is opposite to the chamber opening 110, so that the cigarette A00 can be inserted into the cigarette holding chamber 100 at this end when the ventilation end cap 400 is opened. While the ventilation end cap 400 is covered, the cigarette holding chamber 100 can be retained. In this embodiment, the ventilation end cap 400 is pivotally connected at the external wall of the automatic cigarette-lighting purifier, which can be prevented from missing. In other embodiments, the ventilation end cap 400 may be removably connected with the cigarette holding chamber 100, for example, the ventilation end cap 400 is removably engaged with the external wall of the automatic cigarette-lighting purifier, or is in removably threaded connection with the external wall of the automatic cigarette-lighting purifier.

When the automatic cigarette-lighting purifier is in use, move the ventilation end cap 400 to expose one end of the cigarette holding chamber 100, put the cigarette into the cigarette holding chamber 100, and the cover the cigarette holding chamber 100 by moving the ventilation end cap 400, thereby the cigarette is retained by the cigarette positioning member 130 and the spring retainer. After starting up the cigarette-lighting member 310, the cigarette can be lighted. By compared with the prior arts, the cigarette can be lighted automatically once it's placed in the automatic cigarette-lighting purifier, and the burned cigarette is always kept in the automatic cigarette-lighting purifier, thus no unfiltered secondhand smoke is produced. Furthermore, the structure of the automatic cigarette-lighting purifier according to the present invention is simple, and the operation is convenient, and the possibilities of scalding and cigarette ash falling are prevented.

Figure 6:
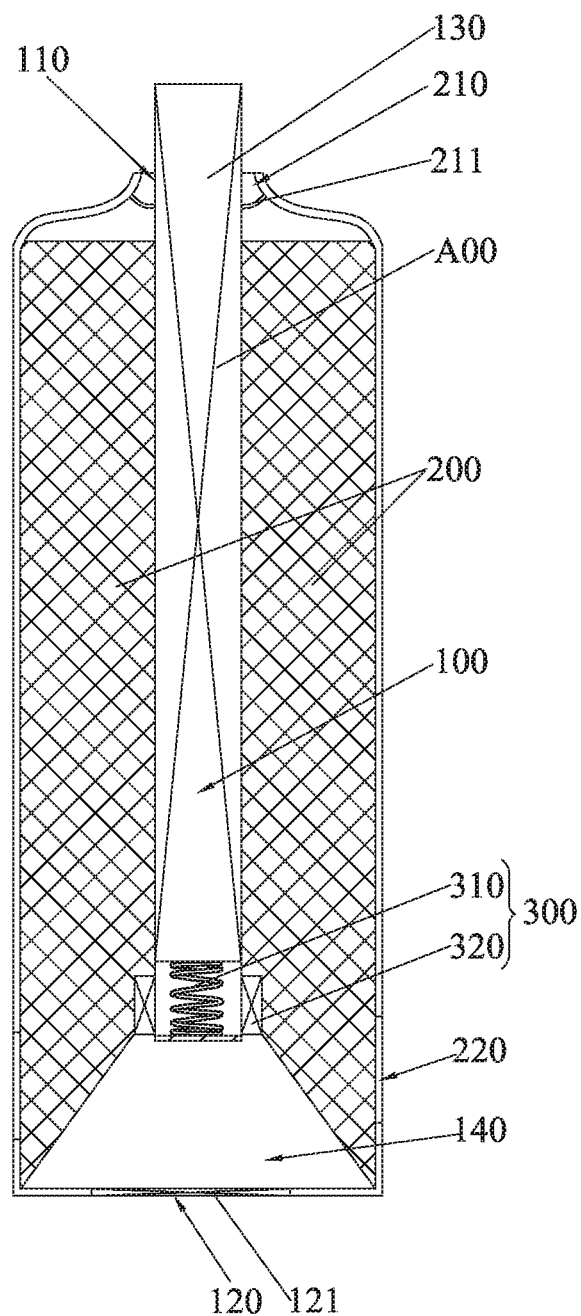
FIG. 6 is a cross section view of an automatic cigarette-lighting purifier according to a third embodiment of the present invention.

FIG. 6 shows a third embodiment of the automatic cigarette-lighting purifier.

In the previous embodiment, since the first check valve 121 is configured at the air intake port 120, thus external air may be drawn into the cigarette holding chamber 100 only when user smokes, as a result, it's possible that the cigarette may not be burned sufficiently in the chamber 100 due to insufficient oxygen. In view of this consideration, in this embodiment, an auxiliary air cavity 140 is formed at the end of the cigarette holding chamber 100 that is opposite the chamber opening 110, and the air intake port 120 of the first check valve 121 is configured at the side of the auxiliary air cavity 140 that is opposite to the chamber opening 110. When user smokes, major external air will enter to the cigarette holding chamber 100 and the auxiliary air cavity 140. When user stops smoking, the cigarette A00 may be kept in burning for a period by relying on the remaining air in the auxiliary air cavity 140. Furthermore, the auxiliary air cavity 140 may store the smoke gas produced by cigarette burning, and the smoke gas stored therein still may be sucked to prevent waste. Furthermore, by means of increasing the space between the cigarette burning end of the air intake port 120, the auxiliary air cavity 140 may efficiently reduce the partial overlarge air pressure which is produced by cigarette burning.

Figure 7:
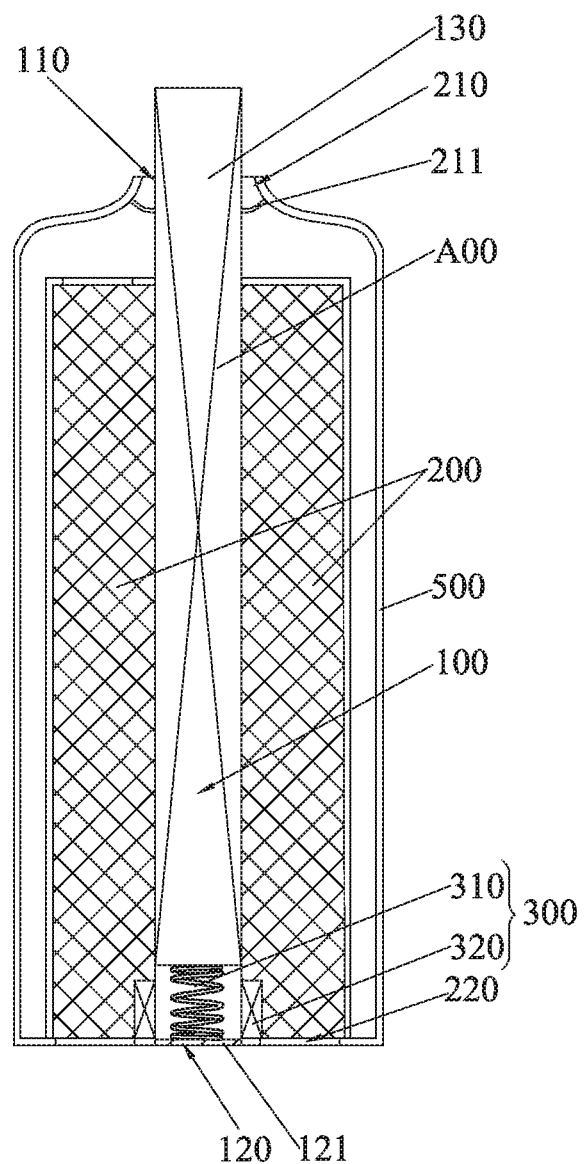
FIG. 7 is a cross section view of an automatic cigarette-lighting purifier according to a fourth embodiment of the present invention.
Figure 8:
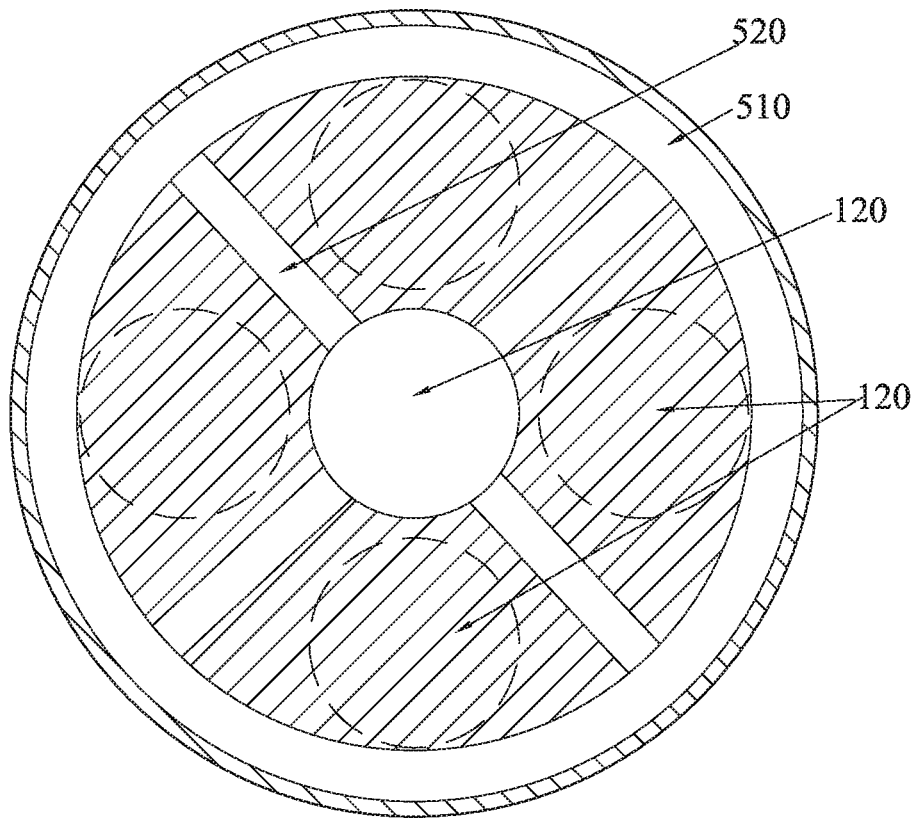
FIG. 8 is another cross section view of the automatic cigarette-lighting purifier according to the fourth embodiment of the present invention.

FIGS. 7 and 8 show a fourth embodiment of the automatic cigarette-lighting purifier.

Similarly to the third embodiment, the present embodiment can solve problems of partial overlarge air pressure produced by cigarette burning, but the solution is different.

In this embodiment, a backflow passage is added. Specifically, one end of the backflow passage is communicated with the end of the cigarette holding chamber 100 that is opposite to the chamber opening 110, another end of the backflow passage is communicated with the smoke purification device 200. Based on the backflow passage, the smoke generated by the cigarette burning is guided to and then purified by the smoke purification device 200, and finally exhausted.

As shown in FIG. 7, an outer shell 500 is configured at the outside of the smoke purification device 200, similarly, the outer shell 500 is cylindrical and coaxial with the cigarette holding chamber 100 and the smoke purification device 200. Specifically, the inner diameter of the outer shell 500 is larger than the outer diameter of the smoke purification device 200, and a backflow main passage 510 is formed between the inner edges of the outer shell 500 and the outer edges of the smoke purification device 200. The end of the outer shell 500 that is closed to the chamber opening 110 is communicated with the air inlet 210. Referring to FIG. 8, several backflow branches 520 are formed on the end of the outer shell 500 that is opposite to the chamber opening 110, one end of each backflow branches 520 is communicated with the another end of the cigarette holding chamber with the air intake port 120. The backflow main passage 510 and the backflow branches 520 constitute a backflow passage for guiding and purifying the redundant smokes in the cigarette holding chamber 100.

In this embodiment, the cross section of the backflow branch 520 is small. When user smokes at the chamber opening 110, major external air enters into the cigarette holding chamber 100 from the first check valve 121, and a small quantity of smoke gas will flow back to the cigarette holding chamber 100 via the backflow main passage 510 and the backflow branches 520. Preferably, a third check valve can be configured on the backflow main passage 510 or the backflow branches 520, so as to prevent the smoke gas from flowing back to the cigarette holding chamber 100. Further, the smoke gas entering into the backflow passage is that portion of the smoke gas produced by the cigarette burning during the smoking interval, for saving this portion of the smoke gas, the third check valve can be configured on the position that is closed to the air inlet 210.

Figure 9:
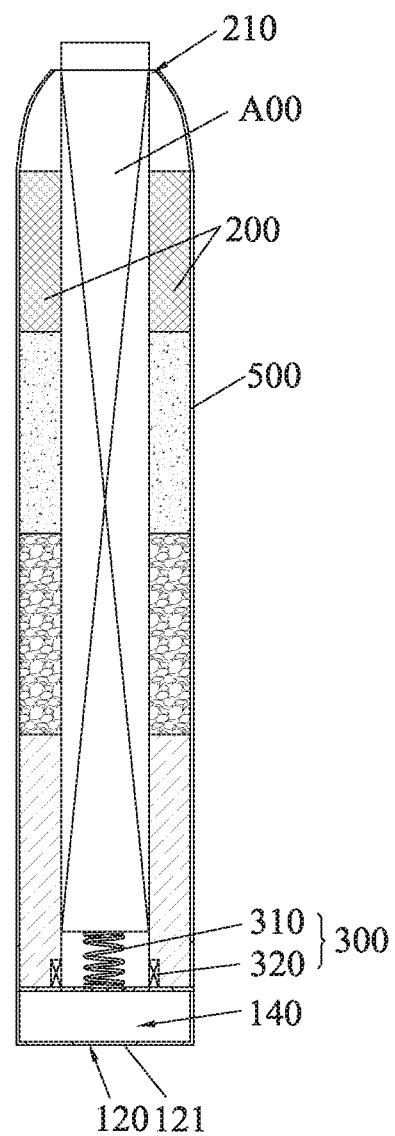
FIG. 9 is a cross section view of an automatic cigarette-lighting purifier according to a fifth embodiment of the present invention.

FIG. 9 shows a fifth embodiment of the automatic cigarette-lighting purifier.

In this embodiment, the outer shell 500 is shaped as a cigar. The smoke purification device 200 is located around the cigarette holding chamber 100. Specifically, the smoke purification device 200 includes a cylindrical receiver that is around the cigarette holding chamber 100 and concentric with the cigarette holding chamber 100. Four filter layers are configured in the cylindrical receiver for filtering the smoke gas, and the filter layers can includes a tar filter layer, a nicotine filter layer, a solid smoke filter layer and a base filter layer. In this embodiment, an auxiliary air cavity 140 is formed at the end of the cigarette holding chamber 100 that is opposite the chamber opening 110, similarly to that shown in FIG. 6, but the shape of the auxiliary air cavity 140 is different. In this embodiment, the shape of the auxiliary air cavity 140 is rectangular, and the function of the auxiliary air cavity 140 is the same with that in FIG. 6.

In comparison of the prior arts, the cigarette can be lighted automatically by the cigarette-lighting device 300 once it's placed in the automatic cigarette-lighting purifier, and the burned cigarette is always kept in the automatic cigarette-lighting purifier, thus no unfiltered secondhand smoke is produced. Furthermore, the structure of the automatic cigarette-lighting purifier according to the present invention is simple, the operation is convenient, and the possibilities of scalding and cigarette ash falling are prevented.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. An automatic cigarette-lighting purifier, comprising a cigarette holding chamber and a smoke purification device located around the cigarette holding chamber, a chamber opening of the cigarette holding chamber and an air inlet of the smoke purification device being located at the same side of the automatic cigarette-lighting purifier, wherein a cigarette-lighting device is provided at one end of the cigarette holding chamber that is opposite to the chamber opening;

the cigarette-lighting device comprises a cigarette-lighting member which is a resistance wire that is in a linear spring shape for lighting a cigarette and a power source for controlling the cigarette-lighting member; a cigarette positioning member is provided at the chamber opening, and the automatic cigarette-lighting purifier further comprises a ventilation end cap that is movable to cover the end of the cigarette holding chamber that is opposite to the chamber opening; and the cigarette-lighting member is located at one side of the ventilation end cap that faces to the cigarette holding chamber and formed toward an interior of the cigarette holding chamber; the cigarette positioning member is a reticular partition configured at a side wall of the cigarette holding chamber, or an annular partition configured at the side wall of the cigarette holding chamber and having a diameter that is smaller than that of the cigarette; when the cigarette-lighting member is in a relaxed situation, a distance between the cigarette positioning member and the end of the ventilation end cap that is opposite to the cigarette-lighting member is shorter than or equal to a length of a cigarette filter.

2. The automatic cigarette-lighting purifier according to claim 1, wherein an air intake port is provided at the end of the cigarette holding chamber that is opposite to the chamber opening, a first check valve is provided at the air intake port to allow air to only flow toward the cigarette holding chamber, and a second check valve is provided at the air inlet of the smoke purification device to allow air to only flow toward the smoke purification device.

3. The automatic cigarette-lighting purifier according to claim 1, wherein one side of the ventilation end cap is pivotally connected to an external wall of the automatic cigarette-lighting purifier, and an engaging device is configured between another side of the ventilation end cap and the external wall of the automatic cigarette-lighting purifier.

4. The automatic cigarette-lighting purifier according to claim 1, wherein the cigarette-lighting member is fixed to the end of the cigarette holding chamber that is opposite to the chamber opening.

5. The automatic cigarette-lighting purifier according to claim 1, wherein a ratio of an inner diameter of the cigarette holding chamber to a diameter of a cigarette is larger than 1:1 and smaller than 1.2:1.

* * * * *